3,178,409
1',4'-DIHYDROANDROSTANO-[17,16α-c]-PYRIDINES AND DERIVATIVES THEREOF

John E. Pike, Kalamazoo, Mich., assignor to The Upjohn Company, Kalamazoo, Mich., a corporation of Delaware
No Drawing. Filed May 6, 1963, Ser. No. 278,442
10 Claims. (Cl. 260—239.5)

This invention relates to novel steroid compounds and to processes for their preparation and is more particularly concerned with novel 1',4'-dihydroandrostano-[17,16α-c]-pyridines and the corresponding androstano-[17,16-c]-pyridines, and with derivatives thereof and with processes for their preparation.

This application is a continuation-in-part of my co-pending application Serial No. 170,262, filed January 31, 1962, now abandoned.

The novel 1',4' - dihydroandrostano-[17,16α-c]-pyridines of the invention can be represented by the following formulae:

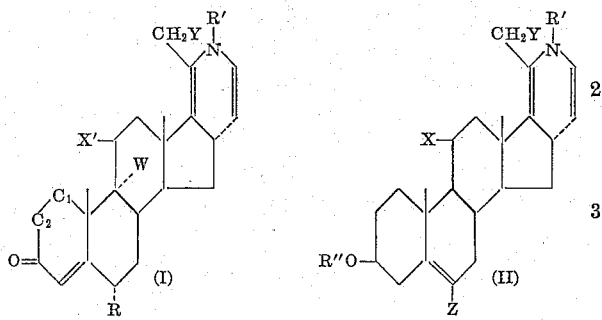

and

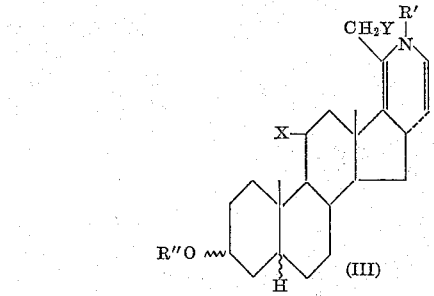

In the above formulae R is selected from the class consisting of hydrogen, fluorine, and methyl, R' is selected from the class consisting of hydrogen, an aliphatic hydrocarbon radical containing from 1 to 8 carbon atoms, inclusive, aralkyl containing from 7 to 13 carbon atoms, inclusive, and aryl containing from 6 to 12 carbon atoms, inclusive, R'' is selected from the class consisting of hydrogen, and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, Z is selected from the class consisting of hydrogen and methyl, and —C₁—C₂— is selected from the class consisting of —CH=CH— and —CH₂—CH₂—.

The term "aliphatic hydrocarbon radical containing from 1 to 8 carbon atoms, inclusive," means a straight or branched chain, saturated or unsaturated, cyclic or acyclic aliphatic hydrocarbon radical containing the stated number of carbon atoms. Illustrative of such radicals are alkyl such as methyl, ethyl, propyl, butyl, amyl, hexyl, heptyl, octyl, and isomeric forms thereof; alkenyl such as vinyl, propenyl, butenyl, pentenyl, hexenyl, heptenyl, octenyl, and isomeric forms thereof; alkynyl such as ethynyl, propynyl, butynyl, pentynyl, hexynyl, heptynyl, octynyl, and isomeric forms thereof; cycloalkyl such as cyclopropyl, cyclobutyl, cyclopentyl, cyclohexyl, cycloheptyl, cyclooctyl, and isomeric forms thereof; cycloalkenyl such as cyclobutenyl, cyclopentenyl, cyclohexenyl, cycloheptenyl, cyclooctenyl, and isomeric forms thereof.

The term "aralkyl containing from 7 to 13 carbon atoms, inclusive," means benzyl, phenethyl, phenylpropyl, benzhydryl, and the like. The term "aryl containing from 6 to 12 carbon atoms, inclusive," means phenyl, tolyl, xylyl, diphenylyl, and the like.

The term "hydrocarbon carboxylic acid containing from 1 to 12 carbon atoms, inclusive," means saturated and unsaturated aliphatic and aromatic carboxylic acids having the required number of carbon atoms, such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentane carboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like.

The novel compounds of the invention having the formulae I, II and III above are compounds of a novel type not hitherto described. These compounds all contain the following basic configuration which also shows the system of numbering employed throughout the specification:

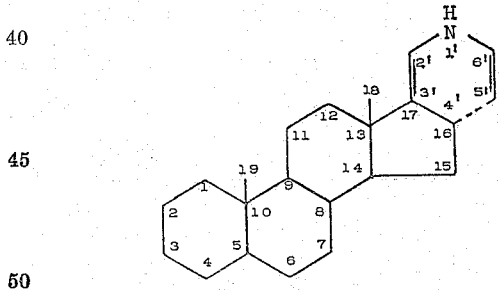

The compounds of the Formulae I, II, and III are all named as derivatives of 1',4'-dihydroandrostano-[17,16α-c]-pyridine.

The novel compounds of the invention having the Formulae I, II and III above can exist in the form of the free bases or in the form of acid addition salts or quaternary ammonium salts. Illustrative of the acids which can be employed in preparing the acid addition salts of the compounds of Formulae I, II and III are sulfuric, hydrochloric, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like.

The quaternary ammonium salts of the compounds of Formulae I, II and III above are the salts obtained by reacting the free bases of said formulae with quaternating agents, for example, lower-alkyl halides, lower-alkenyl halides, di(lower-alkyl)sulfates, aralkyl halides, lower-alkyl arylsulfonates and the like. The term "lower-alkyl" means an alkyl radical containing from 1 to 8 carbon atoms, inclusive, as defined and exemplified above. The term "lower-alkenyl" means an alkenyl radical containing from 2 to 8 carbon atoms, inclusive, as defined and exemplified above. The term "aralkyl" means aralkyl containing from 7 to 13 carbon atoms, inclusive, as hereinbefore defined. The term "aryl" means aryl containing from 6 to 12 carbon atoms, inclusive, as hereinbefore defined.

Examples of quaternary salts of the Formulae I, II and III above are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, and the like.

The novel compounds of the invention having the Formulae I, II and III wherein R' is other than hydrogen can also exist in the form of their N-oxides and the acid addition salts thereof with acids such as those exemplified above. These N-oxides and N-oxide acid addition salts also form part of the present invention.

The novel compounds of Formulae I, II and III including the acid addition salts, quaternary ammonium salts, N-oxides and N-oxide acid addition salts possess pharmacological activity. Illustratively, said compounds are anti-inflammatory agents which are relatively free from the side-effects, such as body weight loss, adrenal inhibition, induction of thymolysis, ulcerogenicity and the like, commonly associated with anti-inflammatory corticosteroids. In addition, the above-named compounds possess activity as progestational, central nervous system regulating, glucocorticoid, antihormonal, lipid-mobilizing, hypotensive, cardiotonic, cholesterol-lowering, and antifertility activity.

The novel compounds of the invention of the Formulae I, II and III above, including their acid addition salts, quaternary ammonium salts, N-oxides, and N-oxide acid addition salts, can be prepared and administered to mammals, including valuable domestic animals, and to birds, in a wide variety of oral or parenteral dosage forms, singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

In addition to their pharmacological activity, the compounds of the Formulae I, II and III are also useful as intermediates. For example, the compounds of the above formulae can be reacted with fluosilicic acid to form the fluosilicate salts which, in dilute aqueous solution, are effective mothproofing agents as more fully disclosed in U.S. Patents 2,075,359 and 1,915,334. In addition, those compounds of Formulae I, II and III above wherein R' is hydrogen can be dehydrogenated to yield the corresponding compounds in which the heterocyclic ring is aromatic, i.e., the compounds having in ring D the following configuration:

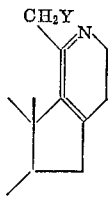

(IV)

wherein the A, B, and C rings correspond to those in the starting materials (I), (II) and (III) with the exceptions noted below.

Said dehydrogenation is effected using dehydrogenating agents known in the art such as selenium dioxide, chloranil, dichlorodicyanoquinone and the like. The starting material of Formula I, II or III [R'=H] is treated with the dehydrogenation agent under acid conditions, preferably in the presence of acetic acid, in an inert organic solvent for example, a lower-aliphatic alcohol such as ethanol, isopropanol, butanol, t-butyl alcohol and the like, or a cyclic ether such as dioxan, tetrahydrofuran, and the like. The reaction is effected advantageously at elevated temperatures, suitably at the reflux temperature of the reaction medium and the desired product is isolated by conventional procedures. For example, the reaction mixture is filtered, the filtrate is evaporated to dryness and the residue is purified by conventional procedures, for example, by recrystallization, chromatography, and the like.

Where the A ring of the starting material (I) contains a $\Delta^4$-3-keto group, said compound is generally converted to the corresponding $\Delta^{1,4}$-3-keto group or $\Delta^{1,4,6}$-3-keto group during the dehydrogenation depending on the dehydrogenating agent used. For example, using dichlorodicyanoquinone or selenium dioxide as dehydrogenating agent a $\Delta^4$-3-keto group will be converted to a $\Delta^{1,4}$-3-keto group. Using chloranil as dehydrogenating agent, a $\Delta^4$-3-keto group will be converted to a $\Delta^{1,4,6}$-3-keto group. Similarly, using chloranil as dehydrogenating agent, a $\Delta^{1,4}$-3-keto group in the starting steroid will be converted to a $\Delta^{1,4,6}$-3-keto group.

The compounds obtained by the dehydrogenation, namely, the compounds of Formulae I, II and III [R'=H] wherein the heterocyclic ring is aromatic as shown in Formula IV, can exist in the form of (a) the free bases (b) acid addition salts with acids such as those set forth above (c) the corresponding N-oxides and N-oxide acid addition salts or (d) the quaternary ammonium salts as described above for compounds (I), (II) and (III). These compounds, in the form of free base, the acid addition salts, N-oxides, N-oxide acid addition salts or quaternary ammonium salts, possess pharmacological activity. Illustratively, said compounds are anti-inflammatory agents which are relatively free from the side effects, hereinbefore described, which are commonly associated with anti-inflammatory corticosteroids. In addition, said compounds possess activity as progestational, central nervous system regulating, glucocorticoid, antihormonal, lipid-mobilizing, hypotensive, cardiotonic, cholesterol-lowering and antifertility activity. The above compounds can be prepared and administered to mammals, including valuable domestic animals in the same manner as described above for the compounds (I), (II) and (III).

The novel compounds of the invention having the Formulae I, II and III above, are also useful as intermediates in the preparation of the compounds in which the heterocyclic ring is fully saturated, i.e., the compounds in which the D-ring has the following configuration:

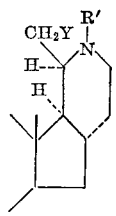

(V)

wherein R' and Y have the significance hereinbefore defined, and wherein the A, B, and C rings correspond to those in the starting materials (I), (II) and (III) with the exceptions noted below.

The preparation of the compounds having the configuration shown in (V) is accomplished by subjecting the corresponding compounds (I), (II) and (III) to hydrogenation in the presence of an hydrogenation catalyst such as palladium, palladium-on-charcoal, platinum oxide, Raney nickel and the like, under conditions conventional for catalytic hydrogenation. The desired products are isolated from the reaction mixture by conventional procedures, for example, by filtration to remove the catalyst, followed by evaporation of the filtrate and purification of the residue by recrystallization, chromatography, and like procedures.

The above hydrogenation, in addition to reduction of the heterocyclic ring of the starting compounds (I), (II) and (III), will also generally cause reduction of any double bonds which are present in the A, B, or C rings of the starting compounds, thereby giving rise to the fully saturated end products. Thus, the $\Delta^4$, $\Delta^{1,4}$, $\Delta^5$, and $\Delta^{9(11)}$-double bonds which may be present in the starting compounds (I), (II) and (III) will generally be reduced during the above hydrogenation. In addition, where the starting material contains a 3-keto group, this will generally be reduced to 3-hydroxy in the above hydrogenation.

The fully reduced compounds having in ring D the configuration (V) above can exist in free base form or in the form of acid addition salts, N-oxides (where R' is other than hydrogen) and N-oxide acid addition salts as set forth above for the compounds of Formulae I, II and III. The fully reduced compounds having in ring D the configuration (V) above, in the form of the free base, acid addition salts, N-oxides or N-oxide acid addition salts, possess pharmacological activity. Illustratively, said compounds are anti-inflammatory agents which are relatively free from the side effects, hereinbefore described, which are commonly associated with anti-inflammatory corticosteroids. In addition, said compounds possess activity as progestational, central nervous system regulating, glucocorticoid, antihormonal, lipid-mobilizing, hypotensive, cardiotonic, cholesterol-lowering, and antifertility activity. The above compounds can be prepared and administered to mammals, including valuable domestic animals, in the same manner as described above for the compounds (I), (II) and (III).

The compounds having the Formulae I, II and III above can be prepared according to the following reaction scheme:

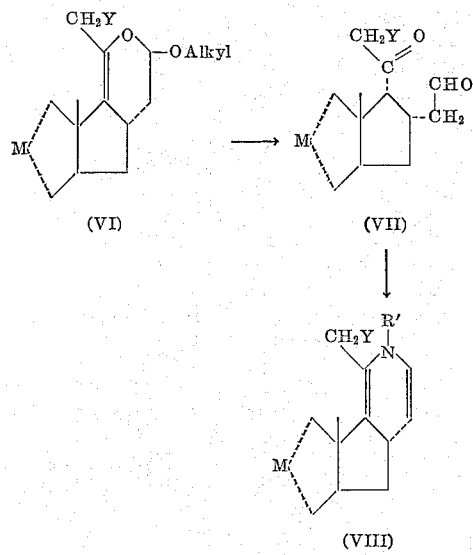

wherein Y and R' have the significance defined above, alkyl means "lower-alkyl" as defined above and M represents the residue of a steroid molecule the A, B, and C rings of which correspond to those in the corresponding rings of compounds (I), (II) and (III).

The starting material (VI) employed in the above process is a 2'-substituted-6'β-alkoxy-5',6'-dihydroandrostano-[17,16α-c]-pyran which has in the A, B, and C rings (represented by the residue M) the appropriate substituents corresponding to those in the A, B, and C rings of compounds (I), (II) and (III). The following basic system of numbering is used throughout the specification and claims when naming a compound having the Formula VI:

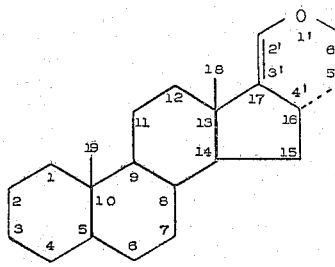

In the process shown schematically above, the starting compound (VI) is subjected to aqueous acid hydrolysis preferably using aqueous lower aliphatic fatty acids such as acetic, propionic and the like. The reaction is advantageously conducted at or below room temperature though moderately elevated temperatures, of the order of about 50° C., can be employed if desired. The hydrolysis generally requires several hours to proceed to completion. The end point can be determined by infrared analysis of samples removed from the reaction mixture. The end product, namely, the 16α-(2-oxoethyl)-17-isopregnane of Formula VII is isolated by conventional procedures, for example, by solvent extraction followed by evaporation of the solvent and purification of the residue by crystallization, chromatography and like procedures.

The compound (VII) so obtained is then condensed with the appropriate amine R'—NH₂, wherein R' is as hereinbefore defined, to obtain the desired compound (VIII). The condensation is carried out by reacting the amine R'—NH₂ and the 16α-aldehyde, if desired in the presence of an inert organic solvent such as dioxan, tetrahydrofuran, dimethylformamide, ether, methylene chloride, carbon tetrachloride and the like. Where the amine is volatile, the condensation is carried out advantageously in a closed vessel. The reaction is normally carried out at or near room temperatures, i.e., of the order of 25° C. although temperatures up to 150° C. may be necessary in certain cases. Where the amine is a liquid or solid at room temperature (25° C.) or at the temperature of reflux of the reaction mixture, the reaction temperature can be raised advantageously to the boiling point of the reaction mixture.

The desired compound (VIII) can be isolated from the reaction mixture by conventional procedures, for example, by removal of excess solvent by distillation and purification of the residue by chromatography, recrystallization, and the like.

Examples of suitable amines of the formula R'—NH₂ are ammonia, methylamine, ethylamine, isopropylamine, sec-butylamine, amylamine, hexylamine, isohexylamine, octylamine, allylamine, 2-butenylamine, 3-hexenylamine, octenylamine, cyclopropylamine, cyclobutylamine, cyclopentylamine, cyclohexylamine, cyclopentylamine, cyclohexenylamine, benzylamine, phenethylamine, 2-phenylpropylamine, benzhydrylamine, aniline, o-, m-, and p-toluidine, o-, m-, and p-xylidine, 1-naphthylamine, 2-naphthylamine, ethynylamine, 1-propynylamine, 2-butynylamine, and the like.

The acid addition salts of the invention, namely, those of the compounds (I), (II) and (III) as well as the corresponding compounds in which the configuration in the D ring is as in (IV) or (V), can be prepared by methods well-known in the art. For example, the acid addition salts of the invention can be prepared by reacting the corresponding free base with the appropriate acid in the presence of an inert solvent such as methanol, ethanol, and the like.

The N-oxides of the invention, namely, the N-oxides of those compounds of Formulae I, II and III wherein R' is other than hydrogen as well as the corresponding compounds in which the configuration in the D ring is as in (IV) or (V), can be prepared by methods well-known in the art, for example, by reacting the corresponding free tertiary base with an oxidizing agent such as hydrogen peroxide, peracetic acid, perbenzoic acid, Caro's acid, and the like. Advantageously, the reaction is carried out at room temperatures (e.g., of the order of 20 to 30° C.) in the presence of an inert solvent such as benzene, chloroform, lower-alkyl alkanoates such as ethyl acetate, and lower-alkanols such as methanol, ethanol, isopropyl alcohol, and the like. Suitably, the oxidizing agent is employed in at least stoichiometric proportions with respect to the free base and preferably the oxidizing agent is present in a slight excess. When the reaction has been completed, any excess of oxidizing agent can be removed by treating the reaction mixture with an agent such as platinum oxide, palladium, Raney nickel, and inorganic hydrosulfites, such as sodium hydrosulfite, and the like.

The N-oxide acid addition salts of the invention can be prepared from the corresponding N-oxide and the appropriate acid using the methods described above for the preparation of the other acid addition salts of the invention.

The compounds having the Formula VI which are employed as starting materials in the process described above can be prepared as described in my copending application Serial No. 170,262, filed January 31, 1962. Briefly, the preparation of the compounds of Formula VI is accomplished by reacting the correspondingly substituted $\Delta^{16}$-20-ketopregnane having the formula:

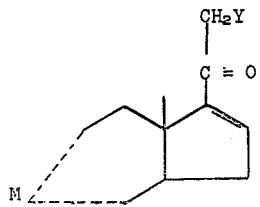

wherein M and Y have the significance hereinbefore defined, with the appropriate alkyl vinyl ether, Alkyl-O—CH=CH$_2$ under conditions normally employed in Diels-Alder reactions. Such conditions are described by, for example, Longley and Emerson, J. Am. Chem. Soc. 72, 3079, 1950; Parham and Holmquist, ibid., 73, 913, 1951; Smith et al., ibid., 73, 5267, 1961; Emerson et al., ibid., 75, 1312, 1953; Korte et al., Tetrahedron, 6, 201, 1959, Ansell and Gadsby, J. Chem. Soc. 3388, 1958; Brannock, J. Org. Chem. 25, 258, 1960.

The condensation is carried out by bringing the $\Delta^{16}$-20-ketopregnane and the alkoxy vinyl ether together, advantageously in the presence of a catalyst, at a temperature within the range of about 25° C. to about 300° C. Any of the catalysts normally employed in the Diels-Alder type condensation (see supra) can be used in the condensation. Such catalysts include hydroquinone, aluminum chloride, boron trifluoride, stannic chloride, ferric chloride, titanium tetrachloride, and the like. The preferred catalyst is hydroquinone.

The alkoxy vinyl ether is present in the reaction mixture advantageously in excess of equimolar proportions with respect to the starting $\Delta^{16}$-20-ketopregnane and preferably in substantial excess of this amount. Advantageously, the excess of alkoxy vinyl ether serves as solvent for the reaction mixture and no other solvent need be used. However, an additional solvent can be present, if desired. Suitable solvents for this purpose are inert organic solvents such as benzene, xylene, toluene, nitrobenzene, dioxane, ether, ethanol, ethylenedichloride, acetic acid, cyclohexane, and the like.

The above reaction gives rise to a mixture of the 16α,6′α-, 16β,6′α-, 16α,6′β-, and 16β,6′β-, epimers of the androstano-[17,16-c]-pyran. This mixture can be separated into its components using conventional procedures such as chromatography, counter-current distribution, and the like, or any combination of these steps.

Examples of 2′-substituted-6′β-alkoxy-5′,6′ - dihydroandrostano-[17,16α-c]-pyrans of Formula VI which can be employed as starting materials in the process of the invention are:

$\Delta^5$-3β-acetoxy-2′-methyl-6′β-methoxy-5′,6′-dihydroandrostano-[17,16α-c]-pyran;
$\Delta^5$-3β-hydroxy-2′-methyl-6′β-methoxy-5′,6′-dihydroandrostano-[17,16α-c]-pyran;
$\Delta^4$-3-keto-2′-methyl-6′β-methoxy-5′,6′-dihydroandrostano-[17,16α-c]-pyran;
$\Delta^4$-3-keto-2′,6α-dimethyl-6′β-methoxy-5′,6′-dihydroandrostano-[17,16α-c]-pyran;
$\Delta^{1,4,9(11)}$-3-keto-2′,6α-dimethyl-6′β-methoxy-5′,6′-dihydroandrostano-[17,16α-c]-pyran;
$\Delta^5$-3β-acetoxy-2′-acetoxymethyl-6′β-methoxy-5′,6′-dihydroandrostano-[17,16α-c]-pyran;
$\Delta^4$-3,11-diketo-2′-methyl-6′β-methoxy-5′,6′-dihydroandrostano-[17,16α-c]-pyran;
$\Delta^4$-3-keto-11α-hydroxy-2′-methyl-6′β-methoxy-5′,6′-dihydroandrostano-[17,16α-c]-pyran;
$\Delta^4$-3-keto-11β-hydroxy-2′-methyl-6′β-methoxy-5′,6′-dihydroandrostano-[17,16α-c]-pyran;
$\Delta^4$-3-keto-11β-hydroxy-2′-acetoxymethyl-6′β-methoxy-5′,6′-dihydroandrostano-[17,16α-c]-pyran;
$\Delta^4$-3,11-diketo-2′-acetoxymethyl-6′β-methoxy-5′,6′-dihydroandrostano-[17,16α-c]-pyran;
$\Delta^4$-3-keto-2′-acetoxymethyl-6′β-methoxy-5′,6′-dihydroandrostano-[17,16α-c]-pyran;
$\Delta^4$-3,11-diketo-6α-methyl-2′-acetoxymethyl-6′β-methoxy-5′,6′-dihydroandrostano-[17,16α-c]-pyran;
$\Delta^4$-3-keto-11β-hydroxy-6α-methyl-2′-acetoxymethyl-6′β-methoxy-5′,6′-dihydroandrostano-[17,16α-c]-pyran;
$\Delta^{4,9(11)}$-3-keto-6α-methyl-2′-acetoxymethyl-6′β-methoxy-5′,6′-dihydroandrostano-[17,16α-c]-pyran;
$\Delta^{1,4}$-3-keto-6α,2′-dimethyl-6′β-methoxy-5′,6′-dihydroandrostano-[17,16α-c]-pyran;
$\Delta^{1,4}$-3-keto-11β-hydroxy-2′-methyl-6′β-methoxy-5′,6′-dihydroandrostano-[17,16α-c]-pyran;
$\Delta^{1,4}$-3,11-diketo-6α-methyl-2′-acetoxymethyl-6′β-methoxy-5′,6′-dihydroandrostano-[17,16α-c]-pyran;
$\Delta^{1,4}$-3-keto-11β-hydroxy-6α-methyl-2′-acetoxymethyl-6′β-methoxy-5′,6′-dihydroandrostano-[17,16α-c]-pyran;
$\Delta^{1,4,9(11)}$-3-keto-6α-methyl-2′-acetoxymethyl-6′β-methoxy-5′,6′-dihydroandrostano-[17,16α-c]-pyran;
$\Delta^{1,4}$-3,11-diketo-2′-methyl-6′β-methoxy-5′,6′-dihydroandrostano-[17,16α-c]-pyran;
$\Delta^{1,4}$-3-keto-11α-hydroxy-2′-methyl-6′β-methoxy-5′,6′-dihydroandrostano-[17,16α-c]-pyran;
$\Delta^{1,4}$-3-keto-11β-hydroxy-2′-acetoxymethyl-6′β-methoxy-5′,6′-dihydroandrostano-[17,16α-c]-pyran;
$\Delta^{1,4}$-3,11-diketo-2′-acetoxymethyl-6′β-methoxy-5′,6′-dihydroandrostano-[17,16α-c]-pyran;
$\Delta^{1,4}$-3-keto-2′-acetoxymethyl-6′β-methoxy-5′,6′-dihydroandrostano-[17,16α-c]-pyran;
$\Delta^5$-3β-acetoxy-2′,6-dimethyl-6′β-methoxy-5′,6′-dihydroandrostano-[17,16α-c]-pyran;
3β-acetoxy-11-keto-2′-acetoxymethyl-6′β-methoxy-5′,6′-dihydro-5α-androstano-[17,16α-c]-pyran;
3β-acetoxy-11β-hydroxy-2′-acetoxymethyl-6′β-methoxy-5′,6′-dihydro-5α-androstano-[17,16α-c]-pyran;
3β-acetoxy-2′-methyl-6′β-methoxy-5′,6′-dihydroandrostano-[17,16α-c]-pyran;
3α-acetoxy-11-keto-2′-methyl-6′β-methoxy-5′,6′-dihydroandrostano-[17,16α-c]-pyran;
3α-acetoxy-11β-hydroxy-2′-methyl-6′β-methoxy-5′,6′-dihydroandrostano-[17,16α-c]-pyran;
3β-acetoxy-2′-methyl-6′β-methoxy-5′,6′-dihydro-5α-androstano-[17,16α-c]-pyran;
3α-acetoxy-2′-methyl-6′β-methoxy-5′,6′-dihydroandrostano-[17,16α-c]-pyran;

Δ⁴-9α-fluoro-3-keto-11β-hydroxy-2'-acetoxymethyl-6'β-methoxy-5',6'-dihydroandrostano-[17,16α-c]-pyran;

Δ⁴-9α-fluoro-3,11-diketo-2'-acetoxymethyl-6'β-methoxy-5',6'-dihydroandrostano-[17,16α-c]-pyran;

Δ¹,⁴-9α-fluoro-3,11-diketo-2'-acetoxymethyl-6'β-methoxy-5'6'-dihydroandrostano-[17,16α-c]-pyran;

Δ¹,⁴-9α-fluoro-3-keto-11β-hydroxy-2'-acetoxymethyl-6'β-methoxy-5',6'-dihydroandrostano-[17,16α-c]-pyran;

Δ⁴-9α-fluoro-3,11-diketo-2'-methyl-6'β-methoxy-5',6'-dihydroandrostano-[17,16α-c]-pyran; and Δ¹,⁴-9α-fluoro-3,11-diketo-2'-methyl-6'β-methoxy-5',6'-dihydroandrostano-[17,16α-c]-pyran.

The following preparations and examples illustrate the best mode contemplated by the inventor for carrying out his invention, but are not to be construed as limiting the scope thereof.

PREPARATION 1

*6α,9α-difluoro-11β-hydroxy-Δ¹,⁴-3 - keto - 6'β - methoxy-2'-acetoxymethyl - 5',6' - dihydroandrostano - [17,16α-c]-pyran*

(A) 6α-FLUORO-21-ACETOXY-1,4,9(11),16-PREGNATETRAENE-3,20-DIONE

A solution of 10 g. of 6α-fluoro-17α,21-dihydroxy-1,4,9(11) - pregnatriene - 3,20 - dione 21 - acetate (U.S. 2,838,499) in 28 ml. of pyridine was stirred at room temperature while a solution of 5.6 g. of N-bromoacetamide in 23 ml. of pyridine was added all at once. The resulting mixture was stirred in the dark for a short period before being cooled to 10° C. and added slowly to 25 ml. of a cooled, saturated, solution of sulfur dioxide in pyridine. After the addition was complete, the resulting mixture was stirred for a short period at room temperature (25° C.) before being poured slowly with stirring into 500 ml. of ice-water. The solid which separated was isolated by filtration, washed with water, and dried. The material so obtained was dissolved in a small quantity of methylene chloride and chromatographed on a column of alumina. The column was eluted with benzene containing increasing proportions of acetone and those fractions which, on the basis of infrared analysis were found to contain the desired material, were combined and evaporated to dryness. The residue was recrystallized from a mixture of acetone and Skellysolve B. There was thus obtained 2.40 g. of 6α-fluoro-21 - acetoxy - 1,4,9(11),16-pregnatetraene-3,20-dione in the form of a crystalline solid having a melting point of 173 to 188° C. An analytical sample having a melting point of 188 to 190° C. was obtained by further recrystallization from a mixture of acetone and Skellysolve B; $[\alpha]_D$ +112° (chloroform).

*Analysis.*—Calcd. for $C_{23}H_{25}O_4F$: C, 71.85; H, 6.56; F, 4.94. Found: C, 72.05; H, 6.46; F, 4.62.

The infrared spectrum of the above material (mineral oil mull) exhibited maxima at 1746, 1678, 1637, 1611, 1582, 1240, and 1223 reciprocal centimeters. The ultraviolet spectrum of the compound (ethanol solution) exhibited maxima at 238 millimicrons ($\epsilon$=24,300).

(B) 6α-FLUORO-9β,11β-OXIDO-21-HYDROXY-1,4,16-PREGNATRIENE-3,20-DIONE 21-ACETATE

To a stirred solution of 8.12 g. of 6α-fluoro-21-acetoxy-1,4,9(11),16-pregnatetraene-3,20-dione in 169 ml. of methylene chloride and 338 ml. of t-butyl alcohol is added a solution of 44.6 g. of N-bromoacetamide in 81 ml. of t-butyl alcohol followed by a solution of 23 ml. of 70% perchloric acid in 122 ml. of water. The resulting mixture is stirred for approximately 20 minutes and then a solution of 4.5 g. of sodium sulfite in 81 ml. of water is added with stirring. The mixture so obtained is concentrated under reduced pressure to a volume of approximately 250 ml. The concentrate is cooled and diluted with an equal volume of water. The solid which separates is isolated by filtration, washed with water, and dried in vacuo. The dried material is heated with stirring under reflux for 24 hrs. with a mixture of 247 ml. of acetone and 8.45 g. of anhydrous potassium acetate. The reaction mixture is cooled and diluted, with stirring, with methylene chloride. The insoluble material is isolated by filtration and washed with methylene chloride. The methylene chloride washings and filtrate are combined and evaporated to dryness. The residue is recrystallized from a mixture of acetone and Skellysolve B (commercial hexanes). There is thus obtained 6α-fluoro-9β,11β-oxido-21-hydroxy-1,4,16-pregnatriene-3,20-dione 21-acetate in the form of a crystalline solid.

(C) 6α,9α-DIFLUORO-11β,21-DIHYDROXY-1,4,16-PREGNATRIENE-3,20-DIONE 21-ACETATE

A solution of 5.05 g. of 6α-fluoro-9β,11β-oxido-21-hydroxy-1,4,16-pregnatriene-3,20-dione 21-acetate in 16 ml. of methylene chloride is cooled in a Dry-Ice acetone bath and added to a solution (maintained in a Dry-Ice acetone bath) of 6.15 g. of anhydrous hydrogen fluoride in 11 ml. of tetrahydrofuran. The resulting mixture is maintained at approximately 4° C. for several hours and then allowed to stand at room temperature (approximately 25° C.) for a short period. The mixture so obtained is added cautiously, with stirring, to a mixture of 25.3 g. of potassium carbonate, ice, and 500 ml. of water. The aqueous mixture so produced is then extracted three times with methylene chloride and the methylene chloride extracts are combined, washed with water, and dried over anhydrous sodium sulfate. The dried methylene chloride solution is evaporated to dryness and the residue is recrystallized from a mixture of acetone and Skellysolve B. There is thus obtained 6α,9α-difluoro-11β,21-dihydroxy-1,4,16-pregnatriene-3,20-dione 21-acetate in the form of a crystalline solid.

(D) 6α,9α - DIFLUORO - 11β - HYDROXY - Δ¹,⁴-3 - KETO-6'β - METHOXY - 2' - ACETOXYMETHYL - 5',6' - DIHYDROANDROSTANO-[17,16α-c]-PYRAN

An autoclave is charged with 80 ml. of methyl vinyl ether, 5.0 g. of 6α,9α-difluoro-11β,21-dihydroxy-1,4,16-pregnatriene-3,20-dione 21-acetate, and 0.1 g. of hydroquinone, and nitrogen is introduced at an initial pressure of approximately 10 p.s.i. The autoclave is sealed and heated with agitation at 200° C. for 24 hrs. The reaction product so obtained is removed from the autoclave and evaporated to dryness. The residue is dissolved in a small quantity of methylene chloride and chromatographed on a column of 250 g. of magnesium silicate (Florisil). The column is eluted with Skellysolve B containing increasing proportions of acetone and those fractions which, on the basis of infrared analysis, are found to contain the desired material are combined and evaporated to dryness. The residue is recrystallized from aqueous methanol. There is thus obtained 6α,9α-difluoro-11β - hydroxy - Δ¹,⁴-3-keto-6'β-methoxy-2'-acetoxymethyl-5',6'-dihydroandrostano-[17,16α-c]-pyran in the form of a crystalline solid.

Similarly, using the procedure set forth in part D above but replacing 6α,9α-difluoro-11β,21-dihydroxy-1,4,16-pregnatriene-3,20-dione 21-acetate by 6α-fluoro-21-acetoxy-4,9(11),16-pregnatriene-3,20-dione [prepared from 6α-fluoro - 17α,21- dihydroxy-4,9(11)-pregnadiene-3,20-dione 21-acetate (U.S. 2,838,545) by the procedure described in part A above], 6α-fluoro-4,16-pregnadiene-3,11,20-trione [prepared from 6α-fluoro-17α-hydroxy-4-pregnene-3,11,20-trione (U.S. 2,838,541) by the procedure described in part A above], 6α-fluoro-1,4,16 pregnatriene-3,20-dione [prepared from 6α-fluoro-17α-hydroxy-1,4-pregnadiene-3,20-dione (U.S. 2,838,531) by the procedure described in part A above], and 6α-fluoro-21-acetoxy-1,4,9(11),16-pregnatetraene-3,20-dione, there are obtained 6α - fluoro - 3-keto-Δ⁴,⁹⁽¹¹⁾-acetoxymethyl-, 6α-fluoro-3,11-diketo-Δ⁴-2'-methyl-, 6α-fluoro-3-keto-Δ¹,⁴-2'-methyl-, and 6α - fluoro-3-keto-Δ¹,⁴,⁹⁽¹¹⁾-2'-acetoxymethyl-6'β-methoxy-5',6'-dihydroandrostano-[17,16α-c]-pyran, respectively.

PREPARATION 2

*9α - fluoro - 11β - hydroxy - 2',6α - dimethyl - Δ$^{1,4}$-3-keto-6'β-methoxy-5',6'-dihydroandrostano-[16,17α-c]-pyran*

(A) 6α-METHYL-1,4,9(11),16-PREGNATETRAENE-3,20-DIONE

A solution of 4.0 g. of 6α-methyl-17α-hydroxy-1,4,9(11)-pregnatriene-3,20-dione (U.S. Patent 2,867,632) in 7.5 ml. of pyridine was cooled to approximately 10° C. To this solution was added with stirring and cooling a solution of 2.0 g. of N-bromoacetamide in 7.5 ml. of pyridine previously cooled to approximately 10° C. The resulting mixture was allowed to stand for a short period at room temperature (approximately 25° C.) before being cooled to about 10° C. and added dropwise with stirring to a solution of 2.2 g. of sulfur dioxide in 10 ml. of pyridine. The temperature during the addition was maintained at approximately 15° C. When the addition was complete, the mixture so obtained was stirred for a short period and allowed to warm to about 20° C. before being added dropwise with stirring to a mixture of 25 ml. of concentrated hydrochloric acid and 400 ml. of ice water. The solid which separated was isolated by filtration, washed with water until the washings were no longer acidic, and recrystallized from methanol. There was thus obtained 1.05 g. of 6α-methyl-1,4,9(11),16-pregnatetraene-3,20-dione in the form of a crystalline solid having a melting point of 205 to 207° C. Further recrystallization from methanol raised the melting point to 210 to 212.5° C.; [α]$_D$ +89° (acetone), $$\lambda_{max.}^{EtOH} = 238 m\mu \quad \epsilon = 24,285$$

*Analysis.*—Calcd. for $C_{22}H_{26}O_2$: C, 81.95; H, 8.13. Found: C, 81.27; H, 7.98.

(B) 6α-METHYL-9β,11β-OXIDOPREGNA-1,4,16-TRIENE-3,20-DIONE

To a stirred solution of 8.12 g. of 6α-methylpregna-1,4,9(11),16-tetraene-3,20-dione in 169 ml. of methylene chloride and 338 ml. of t-butyl alcohol was added a solution of 4.46 g. of N-bromoacetamide in 81 ml. of t-butyl alcohol followed by a solution of 23 ml. of 70% perchloric acid in 122 ml. of water. The resulting mixture was stirred for approximately 20 minutes and then a solution of 4.5 g. of sodium sulfite in 81 ml. of water was added with stirring. The mixture so obtained was concentrated under reduced pressure to a volume of approximately 250 ml. The concentrate was cooled and diluted with an equal volume of water. The solid which separated was isolated by filtration, washed with water, and dried in vacuo. The dried material was heated with stirring under reflux for 24 hours with a mixture of 247 ml. of acetone and 8.45 g. of anhydrous potassium acetate. The reaction mixture was cooled and diluted, with stirring, with 169 ml. of methylene chloride. The insoluble material was isolated by filtration and washed with methylene chloride. The methylene chloride washings and filtrate were combined and evaporated to dryness. The residue was recrystallized from a mixture of acetone and Skellysolve B (commercial hexanes). There was thus obtained 3.43 g. of 6α-methyl-9β,11β-oxidopregna-1,4,16-triene-3,20-dione in the form of a crystalline solid having a melting point of 198 to 210° C.

(C) 6α-METHYL-9α-FLUORO-11β-HYDROXYPREGNA-1,4,16-TRIENE-3,20-DIONE

A solution of 5.05 g. of 6α-methyl-9β,11β-oxidopregna-1,4,16-triene-3,20-dione in 16 ml. of methylene chloride was cooled in a Dry Ice-acetone bath and added to a solution, maintained in a Dry Ice-acetone bath, of 6.15 g. of anhydrous hydrogen fluoride in 11 ml. of tetrahydrofuran. The resulting mixture was maintained at approximately 4° C. for several hours and then allowed to stand at room temperature (approximately 25° C.) for a short period. The mixture so obtained was added cautiously, with stirring, to a mixture of 25.3 g. of potassium carbonate, ice, and 500 ml. of water. The aqueous mixture so produced was extracted three times with methylene chloride and the methylene chloride extracts were combined, washed with water, and dried over anhydrous sodium sulfate. The dried methylene chloride solution was evaporated to dryness and the residue was recrystallized from a mixture of acetone and Skellysolve B. There was thus obtained 6α - methyl - 9α-fluoro-11β-hydroxypregna-1,4,16-triene-3,20-dione in the form of a crystalline solid having a melting point of 278 to 284° C.; [α]$_D$+131° (chloroform).

*Analysis.*—Calcd. for $C_{22}H_{27}FO_3$: C, 73.74; H, 7.50; F, 5.21. Found: C, 73.46; H, 7.88; F, 5.00.

(D) 9α - FLUORO - 11β - HYDROXY - 2',6α - DIMETHYL-Δ$^{1,4}$-3 - KETO - 6'β - METHOXY - 5',6' - DIHYDROANDROSTANO-[16,17α-c]-PYRAN

An autoclave was charged with 80 ml. of methyl vinyl ether, 5.0 g. of 9α-fluoro-6α-methyl-11β-hydroxypregna-1,4,16-triene-3,20-dione and 0.1 g. of hydroquinone; nitrogen was introduced at an initial pressure of approximately 10 p.s.i. The autoclave was sealed and heated with agitation at 200° C. for 24 hours. The reaction product so obtained was removed from the autoclave and evaporated to dryness. The residue was dissolved in a small quantity of methylene chloride and chromatographed on a column of 250 g. of magnesium silicate (Florisil). The column was eluted with Skellysolve B containing increasing proportions of acetone and those fractions, which were found by infrared and paper chromatographic analysis to contain the desired end product, were combined and evaporated to dryness. The residue was recrystallized from methanol. There was thus obtained 1.6 g. of 9α-fluoro-11β - hydroxy-2',6α-dimethyl-Δ$^{1,4}$-3-keto-6'β-methoxy-5',6'-dihydroandrostano-[17,16α-c]-pyran in the form of a crystalline solid having a melting point of 215 to 222° C. An analytical sample having a melting point of 220 to 225° C. was obtained by further recrystallization from methanol.

*Analysis.*—Calcd. for $C_{25}H_{33}O_4F$: C, 72.11; H, 7.93. Found: C, 72.14; H, 8.11.

The infrared spectrum of the above compound (mineral oil mull) exhibited maxima at 3305, 1695, 1657, 1614, 1240, 1150, 1125, 1065 and 1021 reciprocal centimeters. The ultraviolet spectrum of the compound (ethanol solution) exhibited a maximum at 238 millimicrons ($\epsilon$=16,550).

Using the above procedure set forth in parts A, B, C, and D, but replacing 6α-methyl-17α-hydroxy-1,4,9(11)-pregnatriene-3,20-dione employed as starting material in part A by 6α-methyl-17α,21-dihydroxy-1,4,9(11)-pregnatriene-3,20-dione 21-acetate (U.S. 2,964,542), there is obtained 9α-fluoro-11β-hydroxy-6α-methyl-Δ$^{1,4}$-3-keto-6'β-methoxy - 2'-acetoxymethyl-5',6'-dihydroandrostano-[17,16α-c]-pyran in the form of a crystalline solid.

EXAMPLE 1

*16α-(2-oxoethyl)-20-oxo-17-iso-5-pregnen-3β-ol*

A mixture of 2.0 g. of 3β-hydroxy-Δ$^5$-2'-methyl-6'β-methoxy-5',6'-dihydroandrostano-[17,16α-c]-pyran and 50 ml. of 90% aqueous acetic acid was allowed to stand at room temperature (ca. 25° C.) for 18 hr. At the end of this period, 100 ml. of methylene chloride was added and the organic layer was separated, washed successively with water, aqueous bicarbonate solution, and water, and dried over anhydrous sodium sulfate. The dried solution was evaporated to dryness and the residue was dissolved in methylene chloride and chromatographed on a column of magnesium silicate (Florisil). The column was eluted with Skellysolve B containing increasing proportions of acetone and those fractions which, on the basis of infrared analysis, were found to contain the desired material were combined and evaporated to dryness. The residue (1.69 g.) was recrystallized from a mixture of Skellysolve B and acetone. There was thus obtained 16α-(2-oxoethyl)-20-oxo-17-iso-5-pregnen-3β-ol in the form of a crystalline solid having a melting point of 150 to 155° C.

*Analysis.*—Calcd. for $C_{23}H_{34}O_3$: C, 77.05; H, 9.56. Found: C, 76.91; H, 9.86.

Using the above procedure, but replacing 3β-hydroxy-$\Delta^5$-2′-methyl-6′β-methoxy-5′,6′-dihydroandrostano-[17,16α-c]-pyran by $\Delta^5$-3β-acetoxy-2′-methyl-,
$\Delta^4$-3-keto-2′-methyl-,
$\Delta^4$-3-keto-2′,6a-dimethyl-,
$\Delta^{1,4,9(11)}$-3-keto-2′,6α-dimethyl-,
$\Delta^5$-3β-acetoxy-2′-acetoxymethyl-,
$\Delta^4$-3,11-diketo-2′-methyl-,
$\Delta^4$-3-keto-11α-hydroxy-2′-methyl-,
$\Delta^4$-3-keto-11β-hydroxy-2′-methyl-,
$\Delta^4$-3-keto-11β-hydroxy-2′-acetoxymethyl-,
$\Delta^4$-3-keto-11β-hydroxy-2′-hydroxymethyl-,
$\Delta^4$-3,11-diketo-2′-acetoxymethyl-,
$\Delta^4$-3-keto-2′-acetoxymethyl-,
$\Delta^4$-3,11-diketo-6α-methyl-2′-acetoxymethyl-,
$\Delta^4$-3-keto-11β-hydroxy-6α-methyl-2′-acetoxymethyl-,
$\Delta^{4,9(11)}$-3-keto-6α-methyl-2′-acetoxymethyl-,
$\Delta^{1,4}$-3-keto-6α,9α-difluoro-11β-hydroxy-2′-acetoxymethyl-,
$\Delta^{4,9(11)}$-3-keto-6α-fluoro-2′-acetoxymethyl-,
$\Delta^4$-3,11-diketo-6α-fluoro-2′-methyl-,
$\Delta^{1,4}$-3-keto-6α-fluoro-2′-methyl-,
$\Delta^{1,4,9(11)}$-3-keto-6α-fluoro-2′-acetoxymethyl-,
$\Delta^{1,4}$-3-keto-6α,2′-dimethyl-,
$\Delta^{1,4}$-3-keto-11β-hydroxy-2′-methyl-,
$\Delta^{1,4}$-3,11-diketo-6α-methyl-2′-acetoxymethyl-,
$\Delta^{1,4}$-3-keto-11β-hydroxy-6α-methyl-2′-acetoxymethyl-,
$\Delta^{1,4,9(11)}$-3-keto-6α-methyl-2′-acetoxymethyl-,
$\Delta^{1,4}$-3,11-diketo-2′-methyl-,
$\Delta^{1,4}$-3-keto-11α-hydroxy-2′-methyl-,
$\Delta^{1,4}$-3-keto-11β-hydroxy-2′-acetoxymethyl-,
$\Delta^{1,4}$-3,11-diketo-2′-acetoxymethyl-,
$\Delta^{1,4}$-3-keto-2′-acetoxymethyl-,
$\Delta^5$-3β-acetoxy-2′,6-dimethyl-,
3β-acetoxy-2′-methyl-,
3α-acetoxy-11-keto-2′-methyl-,
3α-acetoxy-11β-hydroxy-2′-methyl-,
3α-acetoxy-2′-methyl-,
$\Delta^4$-9α-fluoro-3-keto-11β-hydroxy-2′-acetoxymethyl-,
$\Delta^4$-9α-fluoro-3,11-diketo-2′-acetoxymethyl-,
$\Delta^{1,4}$-9α-fluoro-3,11-diketo-2′-acetoxymethyl-,
$\Delta^{1,4}$-9α-fluoro-3-keto-11β-hydroxy-2′-acetoxymethyl-,
$\Delta^4$-9α-fluoro-3,11-diketo-2′-methyl-,
$\Delta^{1,4}$-9α-fluoro-3-keto-11β-hydroxy-2′,6α-dimethyl-,
$\Delta^{1,4}$-9α-fluoro-3-keto-11β-hydroxy-6α-methyl-2′-acetoxymethyl,
$\Delta^{1,4}$-9α-fluoro-3,11-diketo-2′-methyl-6′β-methoxy-5′,6′-dihydroandrostano-[17,16α-c]-pyran, or
3β-acetoxy-11-keto-2′-acetoxymethyl-6′β-methoxy-5′,6′-dihydro-5α-androstano-[17,16α-c]-pyran, there are obtained:

16α-(2-oxoethyl)-20-oxo-17-iso-5-pregnen-3β-ol 3β-acetate,
16α-(2-oxoethyl)-3,20-dioxo-17-isopregn-4-ene,
16α-(2-oxoethyl)-6α-methyl-3,20-dioxo-17-isopregn-4-ene,
16α-(2-oxoethyl)-6α-methyl-3,20-dioxo-17-isopregn-1,4,9(11)-triene,
16α-(2-oxoethyl)-20-oxo-17-isopregn-5-en-3β,21-diol 3β,21-diacetate,
16α-(2-oxoethyl)-3,11,20-trioxo-17-isopregn-4-ene,
16α-(2-oxoethyl)-3,20-dioxo-17-isopregn-4-ene-11α-ol,
16α-(2-oxoethyl)-3,20-dioxo-17-isopregn-4-ene-11β-ol,
16α-(2-oxoethyl)-3,20-dioxo-17-isopregn-4-ene-11β,21-diol 21-acetate
16α-(2-oxoethyl)-3,20-dioxo-17-isopregn-4-ene-11β,21-diol,
16α-(2-oxoethyl)-3,11,20-trioxo-17-isopregn-4-ene-21-ol 21-acetate,
16α-(2-oxoethyl)-3,20-dioxo-17-isopregn-4-ene-21-ol 21-acetate,
16α-(2-oxoethyl)-6α-methyl-3,11,20-trioxo-17-isopregn-4-ene-21-ol 21-acetate,
16α(2-oxoethyl)-6α-methyl-3,20-dioxo-17-isopregn-4-ene-11β,21-diol 21-acetate,
16α-(2-oxoethyl)-6α-methyl-3,20-dioxo-17-isopregn-4,9(11)-diene-21-ol 21-acetate,
16α-(2-oxoethyl)-6α,9α-difluoro-3,20-dioxo-17-isopregn-1,4-diene-11β,21-diol 21-acetate,
16α-(2-oxoethyl)-6α-fluoro-3,20-dioxo-17-isopregn-4,9(11)-diene-21-ol 21-acetate,
16α-(2-oxoethyl)-6α-fluoro-3,11,20-trioxo-17-isopregn-4-ene,
16α-(2-oxoethyl)-6α-fluoro-3,20-dioxo-17-isopregna-1,4-diene,
16α-(2-oxoethyl)-6α-fluoro-3,20-dioxo-17-isopregna-1,4,9(11)-diene-21-ol 21-acetate,
16α(2-oxoethyl)-6α-methyl-3,20-dioxo-17-isopregna-1,4-diene,
16α-(2-oxoethyl)-3,20-dioxo-17-isopregna-1,4-diene-11β-ol,
16α-(2-oxoethyl)-6α-methyl-3,11,20-trioxo-17-isopregna-1,4-diene-21-ol 21-acetate,
16α-(2-oxoethyl)6α-methyl-3,20-dioxo-17-isopregna-1,4-diene-11β,21-diol 21-acetate,
16α-(2-oxoethyl)-6α-methyl-3,20-dioxo-17-isopregna-1,4-9(11)-diene-21-ol 21-acetate,
16α-(2-oxoethyl)-3,11,20-trioxo-17-isopregna-1,4-diene,
16α-(2-oxoethyl)-3,20-dioxo-17-isopregna-1,4-diene-11α-ol,
16α-(2-oxoethyl)-3,20-dioxo-17-isopregna-1,4-diene-11β,21-diol 21-acetate,
16α-(2-oxoethyl)-3,11,20-trioxo-17-isopregna-1,4-diene-21-ol 21-acetate,
16α-(2-oxoethyl)-3,20-dioxo-17-isopregna-1,4-diene-21-ol 21-acetate,
16α-(2-oxoethyl)-6-methyl-20-oxo-17-isopregn-5-ene-3β-ol 3β-acetate,
16α-(2-oxoethyl)-20-oxo-17-isopregnane-3β-ol 3-acetate,
16α(2-oxoethyl)-11,20-dioxo-17-isopregnane-3α-ol 3-acetate,
16α(2-oxoethyl)-20-oxo-17-isopregnane-3α,11β-diol 3-acetate,
16α-(2-oxoethyl)-20-oxo-17-isopregnane-3α-ol 3-acetate,
16α-(2-oxoethyl)-3,20-dioxo-9α-fluoro-17-isopregn-4-ene-11β,21-diol 21-acetate,
16α-(2-oxoethyl)-3,11,20-trioxo-9α-fluoro-17-isopregn-4-ene-21-ol 21-acetate,
16α-(2-oxoethyl)-3,11,20-trioxo-9α-fluoro-17-isopregna-1,4-diene-21-ol 21-acetate,
16α-(2-oxoethyl)-3,20-dioxo-9α-fluoro-17-isopregna-1,4-diene-11β,21-diol 21-acetate,
16α-(2-oxoethyl)-9α-fluoro-3,11,20-trioxo-17-isopregn-4-ene,
16α-(2-oxoethyl)-3,20-dioxo-6α-methyl-9α-fluoro-17-isopregna-1,4-diene-11β-ol,
16α-(2-oxoethyl)-3,20-dioxo-6α-methyl-9α-fluoro-17-isopregna-1,4-diene-11β,21-diol 21-acetate,
16α-(2-oxoethyl)-9α-fluoro-3,11,20-trioxo-17-isopregna-1,4-diene, and
16α-(2-oxoethyl)-11,20-dioxo-17-isopregnane-3β,21-diol 3,21-diacetate.

EXAMPLE 2

$\Delta^5$ - 3β - hydroxy - 2′ - methyl - 1′,4′ - dihydroandrostano-[17,16α-c]-pyridine A suspension of 2.0 g. of 16α-(2-oxoethyl)-20-oxo-17-iso-5-pregnen-3β-ol in 30 ml. of liquid ammonia was maintained in a sealed tube at room temperature (ca. 25° C.) for 18 hr. The reaction mixture was shaken occasionally during the early stages until the mixture became homogenous. At the end of the reaction time, the tube was opened and the liquid ammonia was allowed to evaporate. The residue was dried in vacuo. There was thus obtained 1.38 g. of $\Delta^5$-3β-hydroxy-2′-methyl-1′,4′-dihydroandrostano-[17,16α-c]-pyridine (ammonia solvate)

in the form of a crystalline solid having a melting point of 169 to 175° C.

*Analysis.*—Calcd. for $C_{23}H_{35}ON \cdot NH_3$: C, 77.04; H, 10.68; N, 7.81. Found: C, 77.59; H, 10.06; N, 6.98.

The infrared spectrum of the compound (mineral oil mull) exhibited maxima at 3350, 3190, 1630, 1601, 1080 and 1065 reciprocal centimeters.

Using the above procedure but replacing the 16α-(2-oxoethyl)-20-oxo-17-iso-5-pregnene-3β-ol by any of the 16α-(2-oxoethyl)-17-isopregnanes shown at the end of Example 1, there are obtained the corresponding 1′,4′-dihydroandrostano-[17,16α-c]-pyridines. Illustrative of the compounds so obtained are:

$\Delta^5$-3β-acetoxy-2′-methyl-,
$\Delta^4$-3-keto-2′-methyl-,
$\Delta^4$-3-keto-2′,6α-dimethyl-,
$\Delta^{1,4,9(11)}$-3-keto-2′,6α-dimethyl-,
$\Delta^5$-3β-acetoxy-2′-acetoxymethyl-,
$\Delta^4$-3,11-diketo-2′-methyl-,
$\Delta^4$-3-keto-11α-hydroxy-2′-methyl-,
$\Delta^4$-3-keto-11β-hydroxy-2′-methyl-,
$\Delta^4$-3-keto-11β-hydroxy-2′-acetoxymethyl-,
$\Delta^4$-3-keto-11β-hydroxy-2′-hydroxymethyl-,
$\Delta^4$-3,11-diketo-2′-acetoxymethyl-,
$\Delta^4$-3-keto-2′-acetoxymethyl-,
$\Delta^4$-3,11-diketo-6α-methyl-2′-acetoxymethyl-,
$\Delta^4$-3-keto-6α-methyl-11β-hydroxy-2′-acetoxymethyl-,
$\Delta^{4,9(11)}$-3-keto-6α-methyl-2′-acetoxymethyl-,
$\Delta^{1,4}$-3-keto-6α,9α-difluoro - 11β - hydroxy - 2′ - acetoxymethyl-,
$\Delta^{4,9(11)}$-3-keto-6α-fluoro-2′-acetoxymethyl-,
$\Delta^4$-3,11-diketo-6α-fluoro-2′-methyl-,
$\Delta^{1,4}$-3-keto-6α-fluoro-2′-methyl-,
$\Delta^{1,4,9(11)}$-3-keto-6α-fluoro-2′-acetoxymethyl-,
$\Delta^{1,4}$-3-keto-6α-methyl-2′-methyl-,
$\Delta^{1,4}$-3-keto-11β-hydroxy-2′-methyl-,
$\Delta^{1,4}$-3,11-diketo-6α-methyl-2′-acetoxymethyl-,
$\Delta^{1,4}$-3-keto-6α-methyl-11β-hydroxy-2′-acetoxymethyl-,
$\Delta^{1,4,9(11)}$-3-keto-6α-methyl-2′-acetoxymethyl-,
$\Delta^{1,4}$-3,11-diketo-2′-methyl-,
$\Delta^{1,4}$-3-keto-11α-hydroxy-2′-methyl-,
$\Delta^{1,4}$-3-keto-11β-hydroxy-2′-acetoxymethyl-,
$\Delta^{1,4}$-3,11-diketo-2′-acetoxymethyl-,
$\Delta^{1,4}$-3-keto-2′-acetoxymethyl-,
$\Delta^5$-3β-acetoxy-6,2′-dimethyl-,
3β-acetoxy-2′-methyl-,
3α-acetoxy-11-keto-2′-methyl-,
3α-acetoxy-11β-hydroxy-2′-methyl-,
3α-acetoxy-2′-methyl-,
$\Delta^4$ - 3 - keto - 9 α - fluoro - 11β - hydroxy - 2′ - acetoxymethyl-,
$\Delta^4$-3,11-diketo-9α-fluoro-2′-acetoxymethyl-,
$\Delta^{1,4}$-3,11-diketo-9α-fluoro-2′-acetoxymethyl-,
$\Delta^{1,4}$-3-keto-11β-hydroxy-9α-fluoro-2′-acetoxymethyl-,
$\Delta^{1,4}$-3-keto-9α-fluoro-11β-hydroxy-2′,6α-dimethyl-,
$\Delta^{1,4}$ - 3 - keto - 9α - fluoro - 11β - hydroxy - 6α - methyl-2′-acetoxymethyl-,
$\Delta^4$-3,11-diketo-9α-fluoro-2′-methyl-, and
$\Delta^{1,4}$ - 3,11 - diketo - 9α - fluoro - 2′ - methyl - 1′,4′ - dihydroandrostano-[17,16α-c]-pyridine.

EXAMPLE 3

$\Delta^5$ - 3β - hydroxy - 1′ - benzyl - 2′ - methyl - 1′,4′ - dihydroandrostano-[17,16α-c]-pyridine A solution of 1 g. of 16α-(2-oxoethyl)-20-oxo-17-iso-5-pregnen-3β-ol and 10 ml. of benzylamine in 10 ml. of benzene was allowed to stand for several days at room temperature (ca. 25° C.) and then heated 30 hours on a steam bath. At the end of this period, the mixture was evaporated to remove the solvent and the residue was cooled and triturated with ether. The crystalline solid which separated was isolated by filtration, washed with ether and dried. There was thus obtained $\Delta^5$-3β-hydroxy-1′-benzyl-2′-methyl-1′,4′-dihydroandrostano - [17,16α-c]-pyridine in the form of a crystalline solid having a melting point of 85 to 88° C.

Using the above procedure but replacing benzylamine by ethylamine, isobutylamine, propylamine, hexylamine, octylamine, allylamine, 2-pentenylamine, 3-hexenylamine, cyclohexylamine, 2-cyclopentenylamine, phenethylamine, aniline, 1-naphthylamine and benzhydrylamine, there are obtained $\Delta^5$-3β-hydroxy-1′-ethyl-,
$\Delta^5$-3β-hydroxy-1′-isobutyl-,
$\Delta^5$-3β-hydroxy-1′-propyl-,
$\Delta^5$-3β-hydroxy-1′-hexyl-,
$\Delta^5$-3β-hydroxy-1′-octyl-,
$\Delta^5$-3β-hydroxy-1′-allyl-,
$\Delta^5$-3β-hydroxy-1′-(2-pentenyl)-,
$\Delta^5$-3β-hydroxy-1′-(3-hexenyl)-,
$\Delta^5$-3β-hydroxy-1′-cyclohexyl-,
$\Delta^5$-3β-hydroxy-1′-(2-cyclopentenyl)-,
$\Delta^5$-3β-hydroxy-1′-phenethyl-,
$\Delta^5$-3β-hydroxy-1′-phenyl-,
$\Delta^5$-3β-hydroxy-1′-(1-naphthyl)-, and
$\Delta^5$-3β-hydroxy - 1′ - benzhydryl - 2′ - methyl - 1′,4′ - dihydroandrostano-[17,16α-c]-pyridine, respectively.

Similarly, by reacting the appropriate 16α-(2-oxoethyl)-20-oxo-17-isopregnane with the appropriate primary amine using the procedure of Example 3 in the case of amines which are liquids or solids at room temperature or using the procedure of Example 2 in the case of amines which are gases or highly volatile liquids at room temperature, there are obtained the corresponding 1′-substituted - 1′,4′ - dihydroandrostano - [17,16α - c]-pyridines. Representative of compounds which can be obtained in this manner are:

$\Delta^5$-3β-hydroxy-1′,2′-dimethyl-,
$\Delta^5$-3β-acetoxy-1′-propyl-2′-methyl-,
$\Delta^4$-3-keto-1′-isopropyl-2′-methyl-,
$\Delta^4$-3-keto-1′-octyl-2′,6α-dimethyl-,
$\Delta^{1,4,9(11)}$-3-keto-1′-amyl-2′,6α-dimethyl-,
$\Delta^4$-3,11-diketo-1′-heptyl-2′-methyl-,
$\Delta^4$-3-keto-11α-hydroxy-1′-allyl-2′-methyl-,
$\Delta^4$ - 3 - keto - 11β - hydroxy - 1′ - (2-pentenyl) - 2′-acetoxymethyl-,
$\Delta^4$-3,11-diketo-1′-ethynyl-2′-acetoxymethyl-,
$\Delta^4$ - 3,11 - diketo - 6α - methyl - 1′ - propynyl - 2′-acetoxymethyl-,
$\Delta^{1,4}$ - 3 - keto - 6α,9α - difluoro - 11β - hydroxy - 1′-benzyl-2′-acetoxymethyl-,
$\Delta^4$-3,11-diketo-6α-fluoro-1′-phenethyl-2′-methyl-,
$\Delta^{1,4}$-3-keto-6α-fluoro-1′-phenyl-2′-methyl-,
$\Delta^{1,4}$-3-keto-6α-methyl-1′-(1-naphthyl)-2′-methyl-,
$\Delta^{1,4}$ - 3,11 - diketo - 6α - methyl - 1′ - benzhydryl - 2′-acetoxymethyl-, and
$\Delta^{1,4}$ - 3 - keto - 11β - hydroxy - 9α - fluoro - 1′ - methyl-2′ - acetoxymethyl - 1′,4′ - dihydroandrostano - [17, 16α-c]-pyridine.

EXAMPLE 4

$\Delta^5$-3β-hydroxy-2′-methylandrostano-[17,16-c]-pyridine

A mixture of 0.4 g. of $\Delta^5$-3β-hydroxy-2′-methyl-1′,4′-dihydroandrostano-[17,16α-c]-pyridine and 0.5 g. of chloranil in 30 ml. of benzene, 30 ml. of toluene and 5 ml. of methanol was heated under reflux for 3 hrs. The resulting mixture was cooled and the organic layer was separated and extracted with dilute hydrochloric acid. The acid extract was washed twice with ethyl acetate and then made basic by the addition of an excess of aqueous potassium carbonate solution. The solid which separated was isolated by filtration, washed with water and dried. The material (0.16 g.; melting point 230 to 234° C.) so obtained was recrystallized from methanol and then from a mixture of acetone and Skellysolve B. There was thus obtained $\Delta^5$-3β-hydroxy-2′-methylandrostano-[17,16 - c]-pyridine in the form of a crystalline solid having a melting point of 234 to 236° C.

The infrared spectrum of the above compound (mineral oil mull) exhibited maxima at 3240, 3100, 3040, 1594, 1586, 1572, 1565, 1073, 1052 and 1039 reciprocal centimeters. The ultraviolet spectrum of the compound (ethanol solution) exhibited maxima at 261 and 269 millimicrons.

Using the above procedure but replacing the $\Delta^5$-3β-hydroxy-2'-methyl - 1',4' - dihydroandrostano - [17,16α - c]-pyridine by $\Delta^5$-3β-acetoxy-2'-methyl-,
$\Delta^4$-3-keto-2'-methyl-,
$\Delta^4$-3-keto-2',6α-dimethyl-,
$\Delta^{1,4,9(11)}$-3-keto-2',6α-dimethyl-,
$\Delta^5$-3β-acetoxy-2'-acetoxymethyl-,
$\Delta^4$-3,11-diketo-2'-methyl-,
$\Delta^4$-3-keto-11α-hydroxy-2'-methyl-,
$\Delta^4$-3-keto-11β-hydroxy-2'-methyl-,
$\Delta^4$-3-keto-11β-hydroxy-2'-acetoxymethyl-,
$\Delta^4$-3,11-diketo-2'-acetoxymethyl-,
$\Delta^4$-3-keto-2'-acetoxymethyl-,
$\Delta^4$-3,11-diketo-6α-methyl-2'-acetoxymethyl-,
$\Delta^4$-3-keto-6α-methyl-11β-hydroxy-2'-acetoxymethyl-,
$\Delta^{4,9(11)}$-3-keto-6α-methyl-2'-acetoxymethyl-,
$\Delta^{1,4}$-3-keto-6α,9α-difluoro-11β-hydroxy-2'-acetoxymethyl-,
$\Delta^{4,9(11)}$-3-keto-6α-fluoro-2'-acetoxymethyl-,
$\Delta^4$-3,11-diketo-6α-fluoro-2'-methyl-,
$\Delta^{1,4}$-3-keto-6α-fluoro-2'-methyl-,
$\Delta^{1,4,9(11)}$-3-keto-6α-fluoro-2'-acetoxymethyl-,
$\Delta^{1,4}$-3-keto-2',6α-dimethyl-,
$\Delta^{1,4}$-3-keto-11β-hydroxy-2'-methyl-,
$\Delta^{1,4}$-3,11-diketo-6α-methyl-2'-acetoxymethyl-,
$\Delta^{1,4}$-3-keto-6α-methyl-11β-hydroxy-2'-acetoxymethyl-,
$\Delta^{1,4,9(11)}$-3-keto-6α-methyl-2'-acetoxymethyl-,
$\Delta^{1,4}$-3,11-diketo-2'-methyl-,
$\Delta^{1,4}$-3-keto-11α-hydroxy-2'-methyl-,
$\Delta^{1,4}$-3-keto-11β-hydroxy-2'-acetoxymethyl-,
$\Delta^{1,4}$-3,11-diketo-2'-acetoxymethyl-,
$\Delta^{1,4}$-3-keto-2'-acetoxymethyl-,
$\Delta^5$-3β-acetoxy-6,2'-dimethyl-,
3β-acetoxy-2'-methyl-,
3α-acetoxy-11-keto-2'-methyl-,
3α-acetoxy-11β-hydroxy-2'-methyl-,
3α-acetoxy-2'-methyl-,
$\Delta^4$-3-keto-9α-fluoro-11β-hydroxy-2'-acetoxymethyl-,
$\Delta^4$-3,11-diketo-9α-fluoro-2'-acetoxymethyl-,
$\Delta^{1,4}$-3,11-diketo-9α-fluoro-2'-acetoxymethyl-,
$\Delta^{1,4}$-3-keto-11β-hydroxy-9α-fluoro-2'-acetoxymethyl-,
$\Delta^{1,4}$-3-keto-9α-fluoro-11β-hydroxy-2',6α-dimethyl-,
$\Delta^{1,4}$-3-keto-9α-fluoro-11β-hydroxy-6α-methyl-2'-acetoxymethyl-,
$\Delta^4$-3,11-diketo-9α-fluoro-2'-methyl-, and
$\Delta^{1,4}$-3,11-diketo-9α-fluoro-2'-methyl-1',4'-dihydroandrostano-[17,16α-c]-pyridine, there are obtained:

$\Delta^5$-3β-acetoxy-2'-methyl-,
$\Delta^{4,6}$-3-keto-2'-methyl-,
$\Delta^{4,6}$-3-keto-2',6-dimethyl-,
$\Delta^{1,4,6,9(11)}$-3-keto-2',6-dimethyl-,
$\Delta^5$-3β-acetoxy-2'-acetoxymethyl-,
$\Delta^{4,6}$-3,11-diketo-2'-methyl-,
$\Delta^{4,6}$-3-keto-11α-hydroxy-2'-methyl-,
$\Delta^{4,6}$-3-keto-11β-hydroxy-2'-methyl-,
$\Delta^{4,6}$-3-keto-11β-hydroxy-2'-acetoxymethyl-,
$\Delta^{4,6}$-3,11-diketo-2'-acetoxymethyl-,
$\Delta^{4,6}$-3-keto-2'-acetoxymethyl-,
$\Delta^{4,6}$-3,11-diketo-6-methyl-2'-acetoxymethyl-,
$\Delta^{4,6}$-3-keto-6-methyl-11β-hydroxy-2'-acetoxymethyl-,
$\Delta^{4,6,9(11)}$-3-keto-6-methyl-2'-acetoxymethyl-,
$\Delta^{1,4,6}$-3-keto-6,9α-difluoro-11β-hydroxy-2'-acetoxymethyl-,
$\Delta^{4,6,9(11)}$-3-keto-6-fluoro-2'-acetoxymethyl-,
$\Delta^{4,6}$-3,11-diketo-6-fluoro-2'-methyl-,
$\Delta^{1,4,6}$-3-keto-6-fluoro-2'-methyl-,
$\Delta^{1,4,6,9(11)}$-3-keto-6-fluoro-2'-actoxymethyl-,
$\Delta^{1,4,6}$-3-keto-2',6-dimethyl-,
$\Delta^{1,4,6}$-3-keto-11β-hydroxy-2'-methyl-,
$\Delta^{1,4,6}$-3,11-diketo-6-methyl-2'-acetoxymethyl-,
$\Delta^{1,4,6}$-3-keto-6-methyl-11β-hydroxy-2'-acetoxymethyl-,
$\Delta^{1,4,6,9(11)}$-3-keto-6-methyl-2'-acetoxymethyl-,
$\Delta^{1,4,6}$-3,11-diketo-2'-methyl-,
$\Delta^{1,4,6}$-3-keto-11α-hydroxy-2'-methyl-,
$\Delta^{1,4,6}$-3-keto-11β-hydroxy-2'-acetoxymethyl-,
$\Delta^{1,4,6}$-3,11-diketo-2'-acetoxymethyl-,
$\Delta^{1,4,6}$-3-keto-2'-acetoxymethyl-,
$\Delta^5$-3β-acetoxy-6,2'-dimethyl-,
3β-acetoxy-2'-methyl-,
3α-acetoxy-11-keto-2'-methyl-,
3α-acetoxy-11β-hydroxy-2'-methyl-,
3α-acetoxy-2'-methyl-,
$\Delta^{4,6}$-3-keto-9α-fluoro-11β-hydroxy-2'-acetoxymethyl-,
$\Delta^{4,6}$-3,11-diketo-9α-fluoro-2'-acetoxymethyl-,
$\Delta^{1,4,6}$-3,11-diketo-9α-fluoro-2'-acetoxymethyl-,
$\Delta^{1,4,6}$-3-keto-11β-hydroxy-9α-fluoro-2'-acetoxymethyl-,
$\Delta^{1,4,6}$-3-keto-9α-fluoro-11β-hydroxy-2',6α-dimethyl-,
$\Delta^{1,4,6}$-3-keto-9α-fluoro-11β-hydroxy-6α-methyl-2'-acetoxymethyl-,
$\Delta^{4,6}$-3,11-diketo-9α-fluoro-2'-methyl-, and
$\Delta^{1,4,6}$-3,11-diketo-9α-fluoro-2'-methylandrostano-[17,16-c]-pyridine, respectively.

EXAMPLE 5

$\Delta^5$-3β-hydroxy-1'-benzyl-2'-methyl-1',4'-dihydroandrostano-[17,16-c]-pyridine hydrochloride A solution of 1 g. of $\Delta^5$-3β-hydroxy-1'-benzyl-2'-methyl-1',4'-dihydroandrostano-[17,16-c]-pyridine in 50 ml. of ether is treated dropwise with a slight excess of an ethereal solution of hydrogen chloride. The solid which separates is isolated by filtration, washed with ether and dried. There is thus obtained the hydrochloride of $\Delta^5$-3β-hydroxy - 1'-benzyl - 2' - methyl - 1',4' - dihydroandrostano-[17,16-c]pyridine in the form of a crystalline solid.

Using the above procedure, but replacing ethereal hydrogen chloride by ethereal hydrogen bromide or ethereal sulfuric acid, there are obtained the hydrobromide and the sulfate, respectively, of $\Delta^5$-3β-hydroxy-1'-benzyl-2'-methyl-1',4'-dihydroandrostano-[17,16-c]-pyridine.

Similarly, by reacting any of the 1',4'-dihydroandrostano-[17,16-c]-pyridines or androstano-[17,16-c] - pyridines of the invention, illustratively, those set forth in Examples 2, 3, and 4, with a slight excess of the equivalent amount of the appropriate acid such as phosphoric, lactic, benzoic, methanesulfonic, p-toluenesulfonic, salicylic, acetic, propionic, malic, tartaric, citric, cyclohexylsulfamic, succinic, nicotinic, ascorbic acids, and the like acids, there are obtained the corresponding acid addition salts.

EXAMPLE 6

$\Delta^5$-3β-hydroxy-1'-benzyl-2'-methyl-1',4'-dihydroandrostano-[17,16-c]-pyridine N-oxide A solution of 0.01 mole of $\Delta^5$-3β-hydroxy-1'-benzyl-2'-methyl-1',4'-dihydroandrostano - [17,16α-c] - pyridine in 100 ml. of absolute ethanol is stirred and treated at room temperature (ca. 25° C.) with 20 ml. of 30 percent by volume hydrogen peroxide. The resulting mixture is stirred for 12 hr. at room temperature before decomposing the excess hydrogen peroxide by the addition of 1.5 g. of platinum oxide. The resulting mixture is stirred until evolution of oxygen ceases and is then filtered. The filtrate is evaporated to dryness under reduced pressure and the residue is recrystallized from ethyl acetate. There is thus obtained $\Delta^5$-3β-hydroxy-1'-benzyl-2'-methyl-1',4'-dihydroandrostano-[17,16-c]-pyridine N-oxide in the form of a crystalline solid This compound is converted to its acid addition salts such as the hydrochloride., hydrobromide, sulfate, and the like, using the procedure set forth in Example 5.

Using the procedure set forth above, or other conventional procedures for preparing N-oxides, other 1'-substituted-1',4'-dihydroandrostano-[17,16α-c] - pyridines of the invention, illustratively, those set forth in Example 3, and other androstano-[17,16-c]-pyridines of the invention, illustratively, those set forth in Example 4, are converted to the corresponding N-oxides and the latter are converted to the corresponding N-oxide acid addition salts by the procedure set forth in Example 5.

EXAMPLE 7

$\Delta^5$-3β-hydroxy-1'-benzyl-2'-methyl-1',4'-dihydroandrostano-[17,16α-c]-pyridine methiodide A solution of 1 g. of $\Delta^5$-3β-hydroxy-1'-benzyl-2'-methyl-1',4'-dihydroandrostano-[17,16α-c]-pyridine in 20 ml. of acetonitrile is cooled in ice and treated slowly, with shaking, with 1.5 ml. of methyl iodide. The resulting mixture is allowed to stand at approximately 25° C. overnight before being poured into ether. The solid which separates is isolated by filtration and is recrystallized from a mixture of ethyl acetate and ether. There is thus obtained $\Delta^5$-3β-hydroxy-1'-benzyl-2'-methyl - 1'.4' - dihydroandrostano-[17,16α-c]-pyridine methiodide in the form of a crystalline solid.

Similarly, using the above procedure, but replacing methyl iodide by ethylbromide, propyl bromide, allyl bromide, and benzyl bromide, there are obtained the ethobromide, propyl bromide, allyl bromide, and benzyl bromide, respectively, of $\Delta^5$-3β-hydroxy-1' - benzyl - 2'-methyl-1',4'-dihydroandrostano-[17,16α-c]-pyridine.

Similarly, using the above procedure, but replacing $\Delta^5$3β-hydroxy-1'-benzyl-2'-methyl - 1',4' - dihydroandrostano-[17,16α-c]-pyridine by any of the 1'-substituted-1',4'-dihydroandrostano-[17,16α-c]-pyridines set forth at the end of Example 3, or any of the androstano-[17,16-c]-pyridines set forth in Example 4, there are prepared the corresponding methiodides and like quaternary salts.

EXAMPLE 8

$\Delta^{1,4,6}$-3-keto-6,9α-difluoro-11β-hydroxy-2'-hydroxymethylandrostano-[17,16-c]-pyridine A solution of 1 g. of $\Delta^{1,4,6}$-3-keto-6,9α-difluoro-11β-hydroxy-2'-acetoxymethylandrostano-[17,16-c] - pyridine in 100 ml. of methanol is freed from oxygen and carbon dioxide by bubbling nitrogen therethrough. A solution of 1 g. of potassium bicarbonate in 10 ml. of water is similarly freed of oxygen and carbon dioxide. The two solutions are mixed and the mixture is stirred in an atmosphere of nitrogen for several hours. A slight excess of aqueous acetic acid is then added and the resulting mixture is evaporated under reduced pressure to remove the methanol. The solid which has separated from the residue is isolated by filtration, washed with water, and dried. There is thus obtained $\Delta^{1,4,6}$-3-keto-6,9α-difluoro-11β-hydroxy-2' - hydroxymethylandrostano - [17,16 - c]-pyridine in the form of a solid Similarly, using the above procedure, other 2'-acetoxymethylandrostano-[17,16-c] - pyridines and 2' - acetoxymethyl-1',4'-dihydroandrostano-[17,16-c] - pyridines and also the 3-acyloxy compounds of the invention, are hydrolyzed to the corresponding free alcohols. Illustratively the following compounds:

$\Delta^5$-3β-acetoxy-2'-methyl-,
$\Delta^5$-3β-acetoxy-2'-acetoxymethyl-,
$\Delta^{4,6}$-3-keto-11β-hydroxy-2'-acetoxymethyl-,
$\Delta^{4,6}$-3,11-diketo-2'-acetoxymethyl-,
$\Delta^{4,6}$-3-keto-6-methyl-11β-hydroxy-2'-acetoxymethyl-,
$\Delta^{1,4,6}$-3-keto-6,9α-difluoro-11β-hydroxy-2'-acetoxymethyl-,
$\Delta^{4,6}$-3-keto-9α-fluoro-11β-hydroxy-2'-acetoxymethyl-, and
$\Delta^{1,4,6}$-3-keto-11β-hydroxy-9α-fluoro-2'-acetoxymethylandrostano-[17,16-c]-pyridine, and
$\Delta^5$-3β-acetoxy-2'-methyl-,
$\Delta^5$-3β-acetoxy-2'-acetoxymethyl-,
$\Delta^4$-3-keto-11β-hydroxy-2'-acetoxymethyl-,
$\Delta^4$-3,11-diketo-2'-acetoxymethyl-,
$\Delta^{4,9(11)}$-3-keto-6α-methyl-2'-acetoxymethyl-,
$\Delta^{4,9(11)}$-3-keto-6α-fluoro-2'-acetoxymethyl-,
$\Delta^{1,4}$-3-keto-9α-fluoro-11β-hydroxy-6α-methyl-2'-acetoxymethyl-,
$\Delta^{1,4}$-3-keto-6α-methyl-11β-hydroxy-2'-acetoxymethyl-, and
3β-acetoxy-2'-methyl-1',4'-dihydroandrostano-[17,16α-c]-pyridine are hydrolyzed using the above procedure to obtain the corresponding free alcohols, namely:

$\Delta^5$-3β-hydroxy-2'-methyl-,
$\Delta^5$-3β-hydroxy-2'-hydroxymethyl-,
$\Delta^{4,6}$-3-keto-11β-hydroxy-2'-hydroxymethyl-,
$\Delta^{4,6}$-3,11-diketo-2'-hydroxymethyl-,
$\Delta^{4,6}$-3-keto-6-methyl-11β-hydroxy-2'-hydroxymethyl-,
$\Delta^{1,4,6}$-3-keto-6,9α-difluoro-11β-hydroxy-2'-hydroxymethyl-,
$\Delta^{4,6}$-3-keto-9α-fluoro-11β-hydroxy-2'-hydroxymethyl-, and
$\Delta^{1,4,6}$-3-keto-11β-hydroxy-9α-fluoro-2'-hydroxymethylandrostano-[17,16-c]-pyridine, and
$\Delta^5$-3β-hydroxy-2'-methyl-,
$\Delta^5$-3β-hydroxy-2'-hydroxymethyl-,
$\Delta^4$-3-keto-11β-hydroxy-2'-hydroxymethyl-,
$\Delta^4$-3,11-diketo-2'-hydroxymethyl-,
$\Delta^{4,9(11)}$-3-keto-6α-methyl-2'-hydroxymethyl-,
$\Delta^{4,9(11)}$-3-keto-6α-fluoro-2'-hydroxymethyl-,
$\Delta^{1,4}$-3-keto-9α-fluoro-11β-hydroxy-6α-methyl-2'-hydroxymethyl-,
$\Delta^{1,4}$-3-keto-6α-methyl-11β-hydroxy-2'-hydroxymethyl-, and
3β-hydroxy-2'-methyl-1',4'-dihydroandrostano-[17,16α-c]-pyridine, respectively.

I claim:
1. A compound selected from the class consisting of:
(a) the free bases having the formulae:

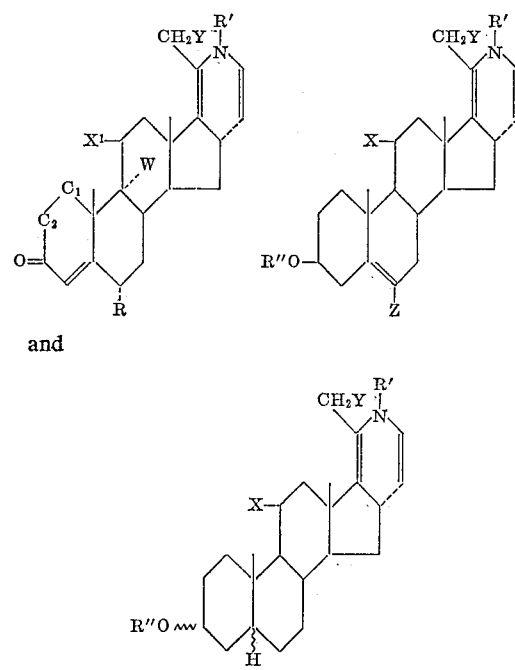

and wherein R is selected from the class consisting of hydrogen, fluorine, and methyl, R' is selected from the class consisting of hydrogen, an aliphatic hydrocarbon radical containing from 1 to 8 carbon atoms, inclusive, aralkyl containing from 7 to 13 carbon atoms, inclusive, and aryl containing from 6 to 12 carbon atoms, inclusive, R'' is selected from the class consisting of hydrogen and the acyl radical of a hydrocarbon carboxylic acid containing from 1 to 12 carbon atoms, inclusive, W is selected from the class consisting of hydrogen and fluorine, $X^1$ is an 11-substituent selected from the class consisting of hydrogen, keto, and α- and β-hydroxy, and X¹ and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, Z is selected from the class consisting of hydrogen and methyl, and —$C_1$—$C_2$— is selected from the class consisting of —CH=CH— and —$CH_2$—$CH_2$—;

(b) the acid addition salts of the free bases having the above formulae;

(c) the N-oxides and N-oxide acid addition salts of those free bases of the above formulae wherein R' is other than hydrogen; and (d) the quaternary ammonium salts of those free bases of the above formulae wherein R' is other than hydrogen.

2. A compound selected from the class consisting of:
(a) the free bases having the formulae:

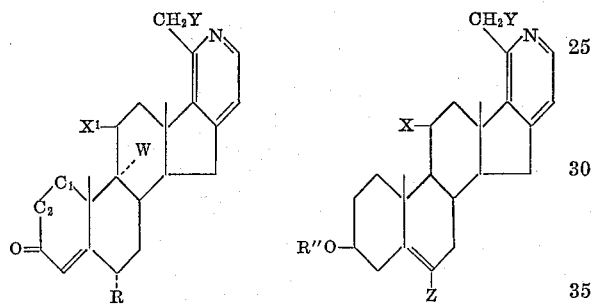

and

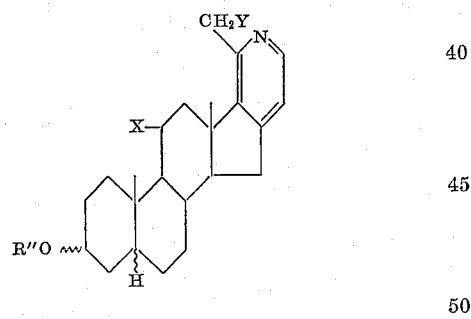

and the Δ⁶ derivatives of the 3-keto compounds of the first formula, wherein R is selected from the class consisting of hydrogen, fluorine, and methyl, R'' is selected from the class consisting of hydrogen, and the acyl radical of a hydrocarbon carboxylic acid containing from 1 to 12 carbon atoms, inclusive, W is selected from the class consisting of hydrogen and fluorine, X¹ is an 11-substituent selected from the class consisting of hydrogen, keto, and α- and β-hydroxy, and X¹ and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, Z is selected from the class consisting of hydrogen and methyl, and —$C_1$—$C_2$— is selected from the class consisting of —CH=CH— and —$CH_2$—$CH_2$—;

(b) the acid addition salts thereof;

(c) the N-oxides and N-oxide acid addition salts thereof; and (d) the quaternary ammonium salts thereof.

3. A compound selected from the class consisting of Δ⁵ - 3β - hydroxy-2'-methyl-1',4'-dihydroandrostano - [17,16α-c]-pyridine having the formula:

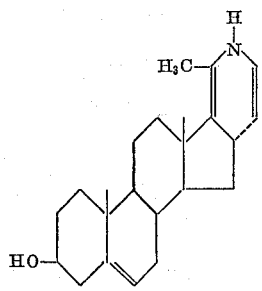

and the acid addition salts thereof.

4. A compound selected from the class consisting of Δ⁵ - 3β - hydroxy - 1'-benzyl-2'-methyl-1,4'-dihydroandrostano-[17,16α-c-]-pyridine having the formula:

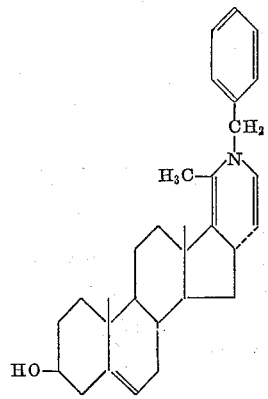

and the acid addition salts thereof.

5. A compound selected from the class consisting of Δ⁵-3β-hydroxy-2'-methylandrostano - [17,16-c] - pyridine having the formula:

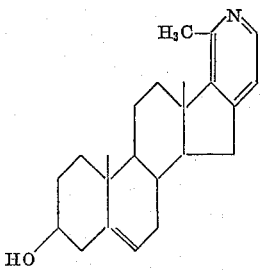

and the acid addition salts thereof.

6. A process which comprises reacting a 16α-(2-oxoethyl)-17-isopregnane having in ring D the following configuration:

wherein Y is selected from the class consisting of hydrogen and acyloxy wherein the acyl radical is that of a hydrocarbon carboxylic acid containing from 1 to 12 carbon atoms, inclusive, with a primary amine $R_1$—$NH_2$ wherein $R_1$ is selected from the class consisting of hydrogen, an aliphatic hydrocarbon radical containing from 1 to 8 carbon atoms, inclusive, aralkyl containing from 7 to 13 carbon atoms, inclusive, and aryl containing from 6 to 12 carbon atoms, inclusive, whereby there is obtained the corresponding 1',4'-dihydroandrostano-[17, 16α-c]-pyridine having in ring D the following configuration:

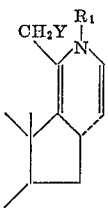

wherein Y and $R_1$ have the significance hereinbefore defined.

7. A process which comprises reacting a 1′,4′-dihydroandrostano-[17,16α-c]-pyridine having in ring D the following configuration:

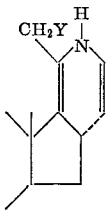

wherein Y is selected from the class consisting of hydrogen and acyloxy wherein the acyl radical is that of a hydrocarbon carboxylic acid having from 1 to 12 carbon atoms, inclusive, with a dehydrogenating agent to produce the corresponding androstano-[17,16-c]-pyridine having in ring D the following configuration:

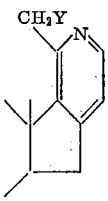

wherein Y has the significance hereinbefore defined.

8. A process which comprises subjecting a 5′,6′-dihydroandrostano-[17,16α-c]-pyran having in ring D the following configuration:

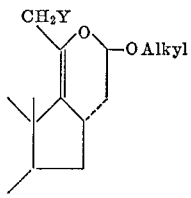

wherein Y is selected from the class consisting of hydrogen and acyloxy wherein the acyl radical is that of a hydrocarbon carboxylic acid containing from 1 to 12 carbon atoms, inclusive, and Alkyl represents lower-alkyl, to aqueous acid hydrolysis to obtain the corresponding 16α-(2-oxoethyl)-17-isopregnane having in ring D the following configuration:

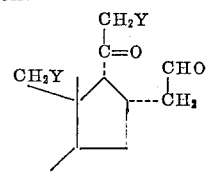

wherein Y has the significance hereinbefore defined.

9. A 16α-(2-oxoethyl)-17-isopregnane selected from the class consisting of compounds having the formulae:

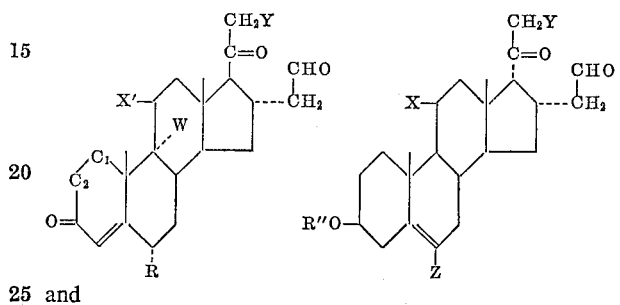

and

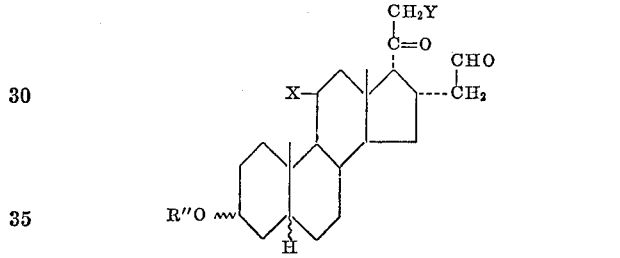

wherein R is selected from the class consisting of hydrogen, fluorine, and methyl, R″ is selected from the class consisting of hydrogen and the acyl radical of a hydrocarbon carboxylic acid containing from 1 to 12 carbon atoms, inclusive, W is selected from the class consisting of hydrogen and fluorine, X′ is an 11-substituent selected from the class consisting of hydrogen, keto, and α- and β-hydroxy, and X′ and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, and acyloxy wherein acyl is as hereinbefore defined, Z is selected from the class consisting of hydrogen and methyl, and —$C_1$—$C_2$— is selected from the class consisting of —CH=CH— and —$CH_2$—$CH_2$—.

10. 16α-(2-oxoethyl)-20-oxo-17-iso-5-pregnen-3β-ol.

References Cited by the Examiner

Ketcheson et al.: Canadian Journ. of Chemistry, 1960, vol. 38, page 976.

LEWIS GOTTS, *Primary Examiner.*